United States Patent [19]

Berger et al.

[11] Patent Number: 4,639,581

[45] Date of Patent: Jan. 27, 1987

[54] INSTRUMENT AXLE FOR POSTAGE METER

[75] Inventors: Erwin Berger, Thörishaus; Rudolf Grünig, Schliern, both of Switzerland

[73] Assignee: Hasler AG Bern, Bern, Switzerland

[21] Appl. No.: 684,277

[22] Filed: Dec. 20, 1984

[51] Int. Cl.⁴ .............................................. G06F 1/106

[52] U.S. Cl. .................................... 235/101; 101/375

[58] Field of Search ........................ 235/101; 101/375; 264/259, 273, 274, 328.18; 52/309, 729, DIG. 7

[56] References Cited

U.S. PATENT DOCUMENTS 4,326,460 4/1982 Nuckel ........................... 235/101 X

*Primary Examiner*—Benjamin R. Fuller

*Attorney, Agent, or Firm*—Horst M. Kasper

[57] ABSTRACT

An axle suitable for a postage meter is disclosed which comprises a metallic core surrounded by a jacket of plastic material which jacket can be produced by injection molding. The cross-section of the core is like an H, and this generates two longitudinal grooves along the axle. In addition several bearing flanges are produced at the jacket, which allow the mounting of the axle as well as the attachment of a drum. Guide plates can be provided at the jacket near the longitudinal grooves.

19 Claims, 5 Drawing Figures

INSTRUMENT AXLE FOR POSTAGE METER

BACKGROUND OF THE INVENTION

1. Field of the Invention

The present invention relates to an axle for an instrument, in particular, for the main axle of a postage meter machine with a rotary printing cylinder.

2. Brief Description of the Background of the Invention Including Prior Art

Postage meter machines commercially available with a rotary printing cylinder incorporate a main axle which supports the printing cylinder. For setting of the meter stamp with the value numerals in the printing cylinder, there are employed for example gear racks disposed at the main axle, which gear racks during a stand still of the printing cylinder are movable by a mechanical drive. Such an axle and instrument has been taught in Hasler Mitteilungen, Vol. 25 (1966) Issue 2, pp. 29-36, and in particular FIGS. 2 and 3 illustrate such a main axle schematically. In a practical embodiment, the main axle represents a fairly complicated component which is conventionally produced by milling and cutting of the raw material and thus is correspondingly expensive.

SUMMARY OF THE INVENTION

1. Purposes of the Invention

It is an object of the present invention to provide an instrument axle which can replace conventional instrumental axles but which is easier to manufacture.

It is another object of the invention to produce an instrument axle which has a core of metal and where the parts interfacing to the machinery are made from plastic material.

It is a further object of the invention to provide an instrument axle in a single plastic injection molding step, onto a metal I bar, which comprises suitable attachment provisions for a flange disk and includes bearing flanges.

These and other objects and advantages of the present invention will become evident from the description which follows.

2. Brief Description of the Invention

The present invention provides a postage meter machine comprising a rotary drive, an axle constructed of a metallic core having a jacket of a plastic material suitable for injection molding processing, where the axle has an H-shaped cross-section providing two grooves between the arms of the H, centered circular bearing flanges attached to the axle formed of a material corresponding to the jacket material, transporting means attached to the axle for moving the mail pieces through the postage meter machine and a system for setting and printing numerals onto the mail pieces coordinated to the mail pieces moving through the postage meter machine.

In the postage meter machine of the present invention, the core of the main axle can be provided by two identical U-shaped sheets of metal which are solidly attached to each other at their back side. A web of the H-shaped core of the axle can be provided with holes filled with material corresponding to the jacket material. The jacket at the edge of the grooves of the H-shaped core can be thickened at the edge of the grooves to guide plates. The H-shaped core can have its arms extended at an end. The extended arms can carry nipples and a flange disk is attached to the axle employing the nipples.

In the postage meter machine of the present invention, the bearing flanges can be constructed as a plurality of neighboring, parallel circular disk sections with uniform diameter and can be connected to each other by webs. The plurality of bearing flanges can be provided of differing diameters such that the diameter of the bearing flange is largest at the one end of the axle supporting the flange disk and that the diameter of the bearing flange disposed at the other end of the axle is smallest.

The plastic material of the jacket of the metallic core of the postage meter machine can be a composite including fibers.

The present invention provides an axle for an instrument comprising a metallic core having a jacket of a plastic material suitable for injection molding processing. The axle has an H-shaped cross-section providing two grooves between the arms of the H and centered circular bearing flanges attached to the axle formed of a material corresponding to the jacket material. The core of the axis can be a piece of a profile material having an H-shape.

The present invention provides a method for production of the axle of a postage meter machine comprising forming two pieces of U-shaped profile of sheet metal, attaching the two pieces of sheet metal to each other at their backs to provide an H-shaped bar, providing for holes passing through the web of said bar, injection molding a jacket of fiber-reinforced plastic around said H-shaped bar together with bearing flanges at the ends of said bar and attaching a flange disk to a bearing flange at an end of said axle.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
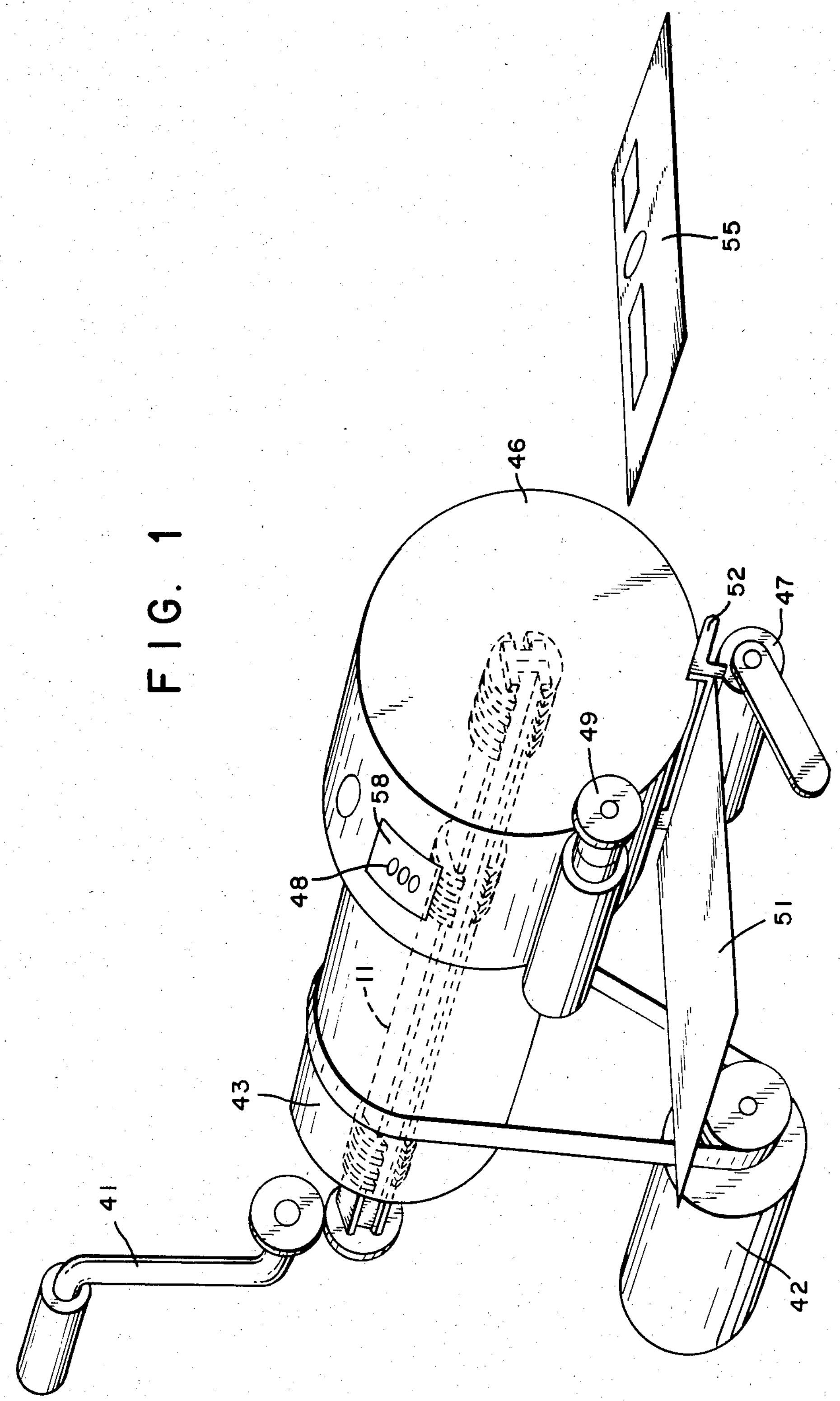
FIG. 1 is a schematic view of a postage meter machine incorporating a main axle.

In accordance with the present invention, there is provided an instrument axle suitable for a postage meter wherein the axle 11 is formed from a metallic core 24, which carries a jacket 25 made of injection molded plastic. The cross-section of the core 24 is of H-shape. Two grooves 12, 13 in the jacket 25 are disposed between the arms of the H-shaped core 24. The axle 11 is provided with centered, circular bearing flanges 14, 15, 16, where the diameter of the bearing flanges is at least that of the axle 11 and where the material of the bearing flanges corresponds to that of the jacket 25.

The core 24 can be provided by a piece of H-shaped profile such as an iron I-beam. The core 24 can alternately be formed from two identical U-shaped bent pieces of sheet metal 27, 28, which are joined at their back sides such that they cannot be separated.

The web of the H-shaped core 24 can be provided with open holes 30 which are filled with the material which corresponds to the material of the jacket of the axle. The arms of the H-shaped core 24 can be extended at one end of the axle 11. The arms can carry connection nipples 32, and a flange disk 17 can be attached to the axle 11 employing the nipples 32.

The bearing flanges 14, 15, 16 can be produced as a plurality of neighboring parallel circular disk sections with a uniform diameter. Preferably, the circular disk sections can be connected and attached to each other with webs.

Alternatively, the bearing flanges 14, 15, 16 can have varying diameters, where the diameter of the bearing flange at the end of the axle 11 is largest for carrying a flange disk 17, and the diameter of the bearing flange 16 at the other end of the axle 11 can be smallest.

The jacket 25 can be thickened at the edge of the grooves 12, 13 to provided guide plates 33. Preferably, the jacket 25 is made from fiber reinforced plastic material, and in particular, glass fiber reinforced material can be employed.

FIG. 1 shows the general layout of a postage meter machine with the axle. It comprises a handle 41 and/or a motor drive 42 to provide rotation to the axle 43. There is provided a rotor drum 46 which is attached to the axle 43 and which carries the numerals 48 to be stamped on a mailing piece. A color cartridge 49 can provide ink to the numerals 48 to be carried onto the mail piece 51. The main piece is carried between the drum 46 and a counter drum 47. A release lever 52 coordinates the passage of the mail pieces. The impressed postage is indicated at 55.

Figure 5:
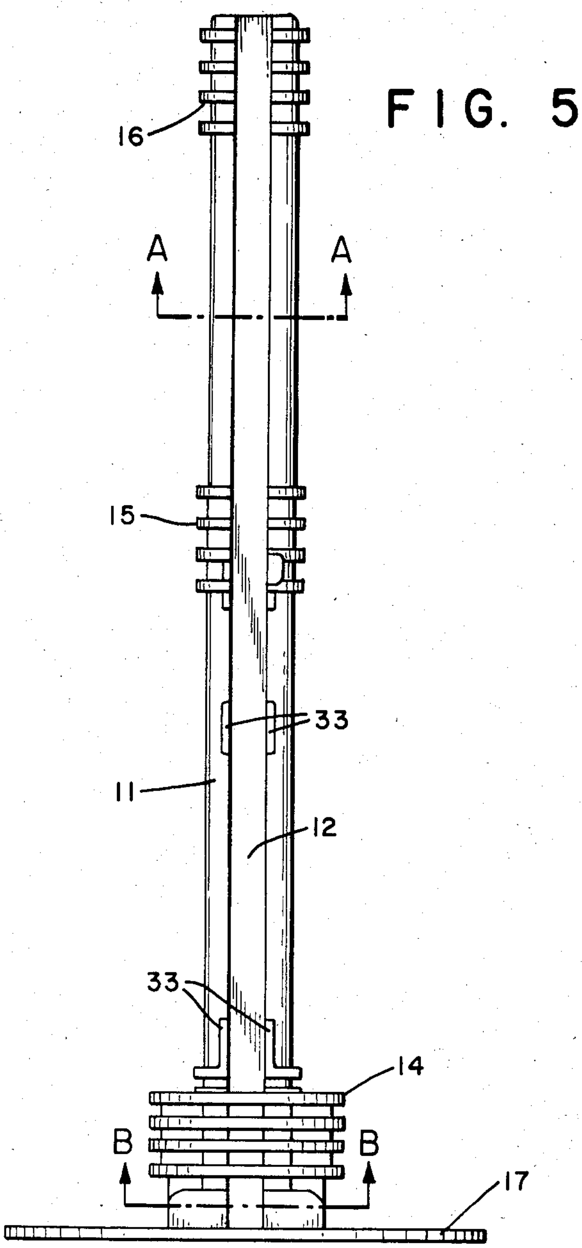

Referring now to FIG. 5, there is shown a plan view onto the instrument axle 11 suitable for a postage meter machine such as, for example, the machine schematically illustrated in FIG. 1. This axle is provided with two longitudinal grooves 12, 13, where the groove 13 is not visible in the view of FIG. 1. The grooves 12, 13 extend over the full length of the axle 11. The axle 11 is provided with overall three bearing flanges 14, 15, 16 which are disposed at its ends and about at the middle. The bearing flanges are formed as an arrangement of each case several, such as for example, four, parallel protrusions disposed next to each other and placed centered around the axle 11 and having a disk shape. The disk shaped protrusions can have the same diameter. The diameters of the bearing flanges can be different in steps and in fact such that the diameter of the bearing flange 14 is largest and the diameter of the bearing flange 16 is smallest, where, however, even this diameter is larger than the diameter of the instrument axle. For example, the diameter of the smaller bearing flanges can be from about 1.05 times to 1.25 of the diameter of the axle and the diameter of the larger bearing flange can be from about 1.5 times to 3 times the diameter of the axle. A flange disk 17 can be flanged to the instrument axle at the side of the bearing flange 14.

Figure 2:
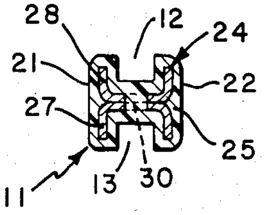
FIG. 2 is a section A—A through the main axle.

FIG. 2 illustrates a section through the apparatus axle 11 at the location A—A of FIG. 5. The cross-section of the axle 11 is like an H-shape based on the two longitudinal grooves 12, 13 and the planar side surfaces 21 and 22. The instrument axle 11 comprises also an H-shaped metallic core and a jacket 25 around the core, which jacket is made of injection moldable plastic.

The core 24 can be provided from an H-shaped profile material. Preferably, it is, however, made as shown from two identical U-shaped bent sheet metal pieces 27, 28 which are joined in an inseparable way on their back side. This joining can be achieved for example by spot welding. The core 25 exhibits several open passages along the web of its H profile, of which FIG. 2 illustrates the opening 30. These openings are filled with the plastic of the jacket and provide additional strength and locking to hold the jacket firmly at the core.

Figure 4:
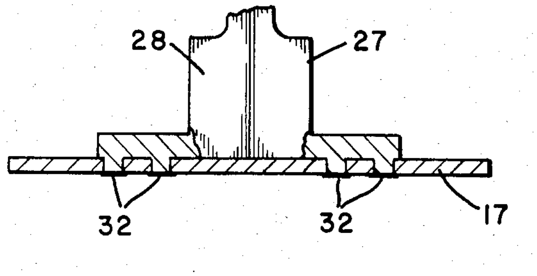
FIG. 4 is a section through a flange disk attached to the main axle and FIG. 5 is a perspective view on the instrument axis.
Figure 3:
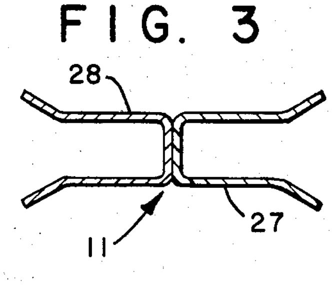
FIG. 3 is a section B—B through the main axle.

A second section through the instrument axle 11 is shown in FIG. 3 at the section location B—B of the FIG. 1 or, respectively, FIG. 4. The U-shaped sheet metal pieces 27, 28 are provided with extended and funnel-shaped outwardly bent arms at this location. The corresponding side view of this is shown in FIG. 4. The extended arms of the sheet metal pieces 27, 28 each carry two connection nipples 32, which rigidly connect the instrument axle 11 to the flange disk 17.

Based on the varying diameters of the bearing flanges 14, 15, 16, it is possible to slide the various bearings of the instrument axle 11 easily onto that axle in a corresponding sequence and to fix them tightly fitting onto the respective bearing flange in each case. Various noses and slots made of the plastic of the jacket 25 are formed, shaped disposed such that the attached bearings are assured against an axial shifting and therefore against a relative rotation versus the axle 11.

The production of the instrument axle is performed in each case in a way generally known by expanding and bending of the U-shaped sheet metal pieces 27, 28, by attaching of these sheet metal pieces for formation of the core 24 and by injection molding of the core jacket 25 with plastic. It is advantageous to employ a fiber reinforced plastic material in order to achieve an increased stability.

The injection molded structure surrounding the axle 11 is performed in an injection mold in order to achieve an accurate formation of the jacket. This allows the production even of complicated forms of the axle 11, which are necessary for the functioning of the machine, in an economical way and without cutting and milling. For example, the guide plates 33 for the gear racks to be disposed in the longitudinal grooves 12, 13 can be easily produced.

It will be understood that each of the elements described above, or two or more together, may also find a useful application in other types of instrument axles differing from the types described above.

While the invention has been illustrated and described as embodied in the context of a postage meter instrument axle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A postage meter machine comprising
a rotary drive;

an axle constructed of a metallic core force transmittingly connected to the rotary drive; arms forming part of the core of the axle with the core defining an H-shaped cross-section with two grooves between said arms of the H; a jacket of a plastic material surrounding the core; centered circular bearing flanges attached to the axle formed of a material corresponding to the jacket material; transporting means driven by the axle for moving mail pieces through the postage meter machine; a system for setting and printing numerals onto the mail pieces coordinated to the mail pieces moving through the postage meter machine.

2. The postage meter machine according to claim 1 wherein the core of the axle is provided by two identical U-shaped sheets of metal which are solidly attached to each other at their back side.

3. The postage meter machine according to claim 1 wherein a web of the H-shaped core of the axle is provided with holes filled with material corresponding to the jacket material.

4. The postage meter machine according to claim 1 wherein the H-shaped core has its arms extended at the end;

where the extended arms carry nipples; and where a flange disk is attached to the axle employing the nipples.

5. The postage meter machine according to claim 4 wherein the bearing flanges are constructed as a plurality of neighboring, parallel circular disk sections with about uniform diameter.

6. The postage meter machine according to claim 4 wherein the neighboring, parallel circular disk sections are connected to each other with webs.

7. The postage meter machine according to claim 4 wherein a plurality of bearing flanges is provided of differing diameters such that the diameter of the bearing flange is largest at the one end of the axle supporting the flange disk and the diameter of the bearing flange disposed at the other end of the axle is smallest.

8. The postage meter machine according to claim 1 wherein the jacket at the edge of the grooves is thickened at the edge of the grooves to guide plates.

9. The postage meter machine according to claim 1 wherein the plastic material of the jacket is a composite including fibers.

10. An axle for supporting a drum of a postage meter machine comprising a metallic core;

arms forming part of the core of the axle and defining an H-shaped cross-section providing two grooves between the arms of the H;

a jacket of a plastic material surrounding the core;

a drum supported by the axle; and centered circular bearing flanges attached to the axle formed of a material corresponding to the jacket material.

11. The axle for supporting a drum of a postage meter machine according to claim 10 therein the core of the axle is a piece of a profile material having an H-shape.

12. The axle for supporting a drum of a postage meter machine according to claim 10 wherein the core of the axle is provided by two identical U-shaped sheets of metal which are solidly attached to each other at their back side.

13. The axle for supporting a drum of a postage meter machine according to claim 10 wherein a web of the H-shaped core of the axle is provided with holes filled with material corresponding to the jacket material.

14. The axle for supporting a drum of a postage meter machine according to claim 10 wherein the H-shaped core has its arms extended at the end; where the extended arms carry nipples; where a flange disk is attached to the axle employing the nipples.

15. The axle for supporting a drum of a postage meter machine according to claim 14 wherein the bearing flanges are constructed as a plurality of neighboring, parallel circular disk sections with uniform diameter.

16. The axle for supporting a drum of a postage meter machine according to claim 14 wherein the neighboring, parallel circular disk sections are connected to each other with webs.

17. The axle for supporting a drum of a postage meter machine according to claim 14 wherein a plurality of bearing flanges is provided of differing diameters such that the diameter of the bearing flange is largest at the end of the axle supporting the flange disk and the diameter of the bearing flange disposed at the other end of the axle is smallest.

18. The axle for supporting a drum of a postage meter machine according to claim 10 wherein the jacket at the edge of the grooves is thickened at the edge of the grooves to guide plates.

19. The axle for supporting a drum of a postage meter machine according to claim 10 wherein the plastic material of the jacket is a composite including fibers.

* * * * *